(12) United States Patent
Kondo

(10) Patent No.: US 11,527,980 B2
(45) Date of Patent: Dec. 13, 2022

(54) ELECTRONIC DEVICE AND HUMAN-POWERED VEHICLE SYSTEM

(71) Applicant: SHIMANO Inc., Sakai (JP)

(72) Inventor: Tomohiro Kondo, Sakai (JP)

(73) Assignee: Shimano Inc., Sakai (JP)

( * ) Notice: Subject to any disclaimer, the term of this patent is extended or adjusted under 35 U.S.C. 154(b) by 634 days.

(21) Appl. No.: 16/505,570

(22) Filed: Jul. 8, 2019

(65) Prior Publication Data

US 2020/0014321 A1    Jan. 9, 2020

(30) Foreign Application Priority Data

| Jul. 9, 2018 | (JP) | JP2018-130244 |
| Jul. 9, 2018 | (JP) | JP2018-130245 |
| Jul. 9, 2018 | (JP) | JP2018-130246 |
| Dec. 18, 2018 | (JP) | JP2018-236763 |

(51) Int. Cl.

| H02P 23/00 | (2016.01) |
| B62M 6/45 | (2010.01) |
| H02P 21/00 | (2016.01) |
| B62K 23/00 | (2006.01) |
| G05B 13/04 | (2006.01) |

(52) U.S. Cl.
CPC .......... *H02P 23/0031* (2013.01); *B62K 23/00* (2013.01); *B62M 6/45* (2013.01); *H02P 21/0021* (2013.01); *G05B 13/04* (2013.01)

(58) Field of Classification Search
CPC .. H02P 23/0031; H02P 21/0021; G05B 13/04

USPC .................................. 318/3, 558; 180/206.2
See application file for complete search history.

(56) References Cited

U.S. PATENT DOCUMENTS

| 5,274,801 A * | 12/1993 | Gordon | G06N 5/04 |
| | | | 706/50 |
| 6,047,230 A | 4/2000 | Spencer et al. | |
| 6,682,087 B1 * | 1/2004 | Takeda | B62K 23/00 |
| | | | 701/52 |
| 6,714,849 B1 | 3/2004 | Ferrero | |
| 6,877,755 B2 | 4/2005 | Takamoto | |

(Continued)

FOREIGN PATENT DOCUMENTS

| DE | 102014007265 A1 | 11/2014 |
| JP | S62261745 A | 11/1987 |

(Continued)

*Primary Examiner* — David Luo
(74) *Attorney, Agent, or Firm* — Alleman Hall Creasman & Tuttle LLP

(57) ABSTRACT

An electronic device includes an artificial intelligence processor that is configured to generate second information for controlling an electric component including at least one of a drive unit that applies propulsion force to a human-powered vehicle, an electric adjustable seatpost, and an electric suspension in accordance with first information related to at least one of the human-powered vehicle, a rider of the human-powered vehicle, and an environment of the human-powered vehicle. The artificial intelligence processor changes a process for generating the second information in accordance with the first information and in accordance with an operation of a first operation unit for operating the at least one of the drive unit, the electric adjustable seatpost, and the electric suspension.

20 Claims, 7 Drawing Sheets

(56) References Cited

U.S. PATENT DOCUMENTS

| | | | |
|---|---|---|---|
| 6,917,283 B2 * | 7/2005 | Takeda | B62K 23/00 340/432 |
| 7,399,244 B2 * | 7/2008 | Takebayashi | B62M 9/122 474/70 |
| 7,522,033 B2 | 4/2009 | Takamoto et al. | |
| 7,760,078 B2 | 7/2010 | Miki et al. | |
| 7,902,967 B2 | 3/2011 | Takebayashi | |
| 8,655,561 B2 | 2/2014 | Kitamura | |
| 9,399,500 B1 | 7/2016 | Hashimoto et al. | |
| 9,975,603 B2 | 5/2018 | Bortolozzo et al. | |
| 10,696,351 B2 | 6/2020 | Suzuki et al. | |
| 2008/0114519 A1 | 5/2008 | DuFaux et al. | |
| 2008/0276493 A1 | 11/2008 | Dunias | |
| 2014/0229054 A1 | 8/2014 | Gerundt et al. | |
| 2015/0197308 A1 | 7/2015 | Butora et al. | |
| 2016/0001782 A1 | 1/2016 | Fiedler | |
| 2016/0075177 A1 | 3/2016 | Biderman et al. | |
| 2016/0121730 A1 | 5/2016 | Fujita et al. | |
| 2016/0144928 A1 | 5/2016 | Chun | |
| 2017/0259879 A1 | 9/2017 | Southey et al. | |
| 2017/0282919 A1 | 10/2017 | Schieffelin | |
| 2018/0009508 A1 | 1/2018 | Suzuki et al. | |
| 2018/0072373 A1 | 3/2018 | Kishita et al. | |
| 2018/0197401 A1 | 7/2018 | Khaligh et al. | |
| 2018/0232982 A1 | 8/2018 | Hsu et al. | |
| 2018/0237104 A1 | 8/2018 | Pasqua et al. | |
| 2019/0126913 A1 | 5/2019 | Kinuhata et al. | |
| 2019/0202512 A1 | 7/2019 | Shen et al. | |
| 2019/0315431 A1 | 10/2019 | Vijaya Kumar et al. | |
| 2020/0010137 A1 | 1/2020 | Komemushi | |
| 2020/0014322 A1 | 1/2020 | Kondo | |
| 2020/0130771 A1 | 4/2020 | Jacobsz Rosier et al. | |
| 2020/0247498 A1 | 8/2020 | Yamamoto et al. | |
| 2020/0410375 A1 | 12/2020 | Seagraves et al. | |
| 2021/0031848 A1 | 2/2021 | Du | |
| 2021/0147024 A1 | 5/2021 | Carlier | |
| 2021/0323622 A1 | 10/2021 | Shen et al. | |
| 2022/0016984 A1 | 1/2022 | Huang et al. | |

FOREIGN PATENT DOCUMENTS

| | | |
|---|---|---|
| JP | H0297732 A | 4/1990 |
| JP | 2002234479 A | 8/2002 |
| JP | 2003507261 A | 2/2003 |
| JP | 2008504857 A | 2/2008 |
| JP | 2012144061 A | 8/2012 |
| JP | 2012148580 A | 8/2012 |
| JP | 2014516007 A | 7/2014 |
| JP | 2016101761 A | 6/2016 |
| JP | 2016134129 A | 7/2016 |
| JP | 5960566 B2 | 8/2016 |
| JP | 2017522634 A | 8/2017 |
| JP | 2018150034 A | 9/2018 |
| WO | 2005058160 A1 | 6/2005 |
| WO | 2014029759 A1 | 2/2014 |
| WO | 2017093293 A1 | 6/2017 |
| WO | 2018059801 A1 | 4/2018 |

* cited by examiner

ELECTRONIC DEVICE AND HUMAN-POWERED VEHICLE SYSTEM

BACKGROUND ART

The present disclosure relates to an electronic device and a human-powered vehicle system.

Patent document 1 discloses an example of an electronic device that executes various controls in accordance with the output of a detection unit provided on a human-powered vehicle.

Patent Document 1: Japanese Laid-Open Patent Publication No. 2012-144061

SUMMARY

The electronic device disclosed in patent document 1 executes various controls in accordance with predetermined conditions. However, the preferred conditions and control change depending on the user, the traveling environment, and the like.

One object of the present disclosure is to provide an electronic device and a human-powered vehicle system that improves usability.

An electronic device in accordance with a first aspect of the present disclosure comprises an artificial intelligence processor configured to generate second information for controlling an electric component including at least one of a drive unit that applies propulsion force to a human-powered vehicle, an electric adjustable seatpost, and an electric suspension in accordance with first information related to at least one of the human-powered vehicle, a rider of the human-powered vehicle, and an environment of the human-powered vehicle. The artificial intelligence processor is configured to change a process for generating the second information in accordance with the first information and in accordance with an operation of a first operation unit for operating the at least one of the drive unit, the electric adjustable seatpost, and the electric suspension.

In accordance with the electronic device of the first aspect, the artificial intelligence processor generates suitable second information in accordance with the first information by changing the process for generating the second information in accordance with the first information and the operation of the first operation unit. This improves usability.

An electronic device in accordance with a second aspect of the present disclosure comprises an artificial intelligence processor configured to generate second information for controlling an electric component provided on a human-powered vehicle in accordance with first information related to at least one of a rider of the human-powered vehicle and an environment of the human-powered vehicle. The artificial intelligence processor is configured to change a process for generating the second information in accordance with the first information and an operation of a first operation unit for operating the electric component.

In accordance with the electronic device of the second aspect, the artificial intelligence processor generates suitable second information by changing the process for generating the second information in accordance with the first information and the operation of the first operation unit. This improves usability.

In accordance with a third aspect of the present disclosure, the electronic device according to the second aspect is configured so that the electric component includes at least one of an electric transmission, a drive unit that applies propulsion force to the human-powered vehicle, an electric adjustable seatpost, and an electric suspension.

In accordance with the electronic device of the third aspect, at least one of the electric transmission, the drive unit, the electric adjustable seatpost, and the electric suspension is suitably controlled.

In accordance with a fourth aspect of the present disclosure, the electronic device according to any one of the first to third aspects further comprises a detection unit that detects the first information.

In accordance with the electronic device of the fourth aspect, the first information is suitably detected by the detection unit.

In accordance with a fifth aspect of the present disclosure, the electronic device according to the fourth aspect is configured so that the detection unit includes a first detector provided on the human-powered vehicle and a second detector provided outside the human-powered vehicle.

In accordance with the electronic device of the fifth aspect, the first information is suitably detected by the first detector and the second detector.

In accordance with a sixth aspect of the present disclosure, the electronic device according to the first aspect is configured so that the first information related to the human-powered vehicle includes at least one of information related to an electric transmission that changes a transmission ratio of the human-powered vehicle, information related to the transmission ratio changed by the electric transmission, information related to a vehicle speed of the human-powered vehicle, information related to a rotational speed of a crank of the human-powered vehicle, information related to human driving force input to the human-powered vehicle, and information related to an inclination of the human-powered vehicle.

In accordance with the electronic device of the sixth aspect, the second information is suitably generated in accordance with at least one of the information related to the electric transmission for changing the transmission ratio of the human-powered vehicle, the information related to the transmission ratio changed by the electric transmission, the information related to the vehicle speed of the human-powered vehicle, the information related to the rotational speed of the crank of the human-powered vehicle, the information related to the human driving force input to the human-powered vehicle, and the information related to the inclination of the human-powered vehicle.

In accordance with a seventh aspect of the present disclosure, the electronic device according to any one of the first to sixth aspects is configured so that the first information related to the rider of the human-powered vehicle includes biological information of the rider.

In accordance with the electronic device of the seventh aspect, the second information is suitably generated in accordance with the biological information of the rider.

In accordance with an eighth aspect of the present disclosure, the electronic device according to any one of the first to seventh aspects is configured so that the first information related to the environment of the human-powered vehicle includes information related to a traveling route of the human-powered vehicle.

In accordance with the electronic device of the eighth aspect, the second information is suitably generated in accordance with the information related to the traveling route of the human-powered vehicle.

In accordance with a ninth aspect of the present disclosure, the electronic device according to the first aspect further comprises a controller configured to control the at least one of the drive unit, the electric adjustable seatpost, and the electric suspension. The controller is configured to operate in a first control state for controlling the at least one of the drive unit, the electric adjustable seatpost, and the electric suspension in accordance with the second information, and a second control state for controlling the at least one of the drive unit, the electric adjustable seatpost, and the electric suspension in accordance with the operation of the first operation unit.

In accordance with the electronic device of the ninth aspect, at least one of the drive unit, the electric adjustable seatpost, and the electric suspension is operated in the first control state and the second control state.

In accordance with a tenth aspect of the present disclosure, the electronic device according to the second aspect further comprises a controller configured to control the electric component. The controller is configured to operate in a first control state for controlling the electric component in accordance with the second information, and a second control state for controlling the electric component in accordance with the operation of the first operation unit.

In accordance with the electronic device of the tenth aspect, the electric component is operated in the first control state and the second control state.

In accordance with an eleventh aspect of the present disclosure, the electronic device according to the ninth or tenth aspect is configured so that the controller switches between the first control state and the second control state in accordance with an operation of a second operation unit.

In accordance with the electronic device of the eleventh aspect, the control state is switched between the first control state and the second control state in accordance with the operation of the second operation unit.

In accordance with a twelfth aspect of the present disclosure, the electronic device according to any one of the ninth to eleventh aspects is configured so that the controller is switched to the second control state in a case where the first operation unit is operated in the first control state.

In accordance with the electronic device of the twelfth aspect, the control state is switched from the first control state to the second control state in accordance with the operation of the first operation unit.

In accordance with a thirteenth aspect of the present disclosure, the electronic device according to any one of the ninth to twelfth aspects is configured so that the controller switches to the first control state in a case where a predetermined condition is satisfied in the second control state.

In accordance with the electronic device of the thirteenth aspect, the control state is switched from the second control state to the first control state by satisfying a predetermined condition.

In accordance with a fourteenth aspect of the present disclosure, the electronic device according to any one of the ninth to thirteenth aspects is configured so that the controller issues a notification with a notification unit in a case where the first control state and the second control state are switched.

In accordance with the electronic device of the fourteenth aspect, the notification unit notifies the rider of the switching between the first control state and the second control state.

In accordance with a fifteenth aspect of the present disclosure, the electronic device according to any one of the first to fourteenth aspects further comprises a communication unit. The first information is input to the artificial intelligence processor through the communication unit.

In accordance with the electronic device of the fifteenth aspect, the first information is suitably acquired by the communication unit.

In accordance with a sixteenth aspect of the present disclosure, the electronic device according to the fifteenth aspect is configured so that the communication unit is connected to the Internet and receives the first information via the Internet.

In accordance with the electronic device of the sixteenth aspect, the first information is suitably acquired via the Internet.

In accordance with a seventeenth aspect of the present disclosure, the electronic device according to any one of the first to sixteenth aspects is configured so that the artificial intelligence processor generates a proposal related to a component of the human-powered vehicle in accordance with the first information.

In accordance with the electronic device of the seventeenth aspect, a proposal related to the component of the human-powered vehicle is generated In accordance with an eighteenth aspect of the present disclosure, the electronic device according to the seventeenth aspect further comprises a display unit for displaying the proposal related to the component of the human-powered vehicle.

In accordance with the electronic device of the eighteenth aspect, the user can recognize the proposal related to the component of the human-powered vehicle from the display unit.

In accordance with a nineteenth aspect of the present disclosure, the electronic device according to any one of the first to eighteenth aspects is configured so that the artificial intelligence processor generates fourth information related to a setting of the human-powered vehicle in accordance with the first information.

In accordance with the electronic device of the nineteenth aspect, the fourth information related to the setting of the human-powered vehicle is generated in accordance with the first information.

A human-powered vehicle system in accordance with a twentieth aspect of the present disclosure comprises the electronic device according to any one of the first to nineteenth aspects, and a controller configured to receive third information related to a process of the artificial intelligence processor from the electronic device and control the electric component in accordance with the first information and the third information.

In accordance with the human-powered vehicle system of the twentieth aspect, the electric component is suitably controlled in accordance with the first information and the third information.

The electronic device and human-powered vehicle system of the present disclosure improve usability.

EMBODIMENTS OF THE DISCLOSURE

Figure 1:
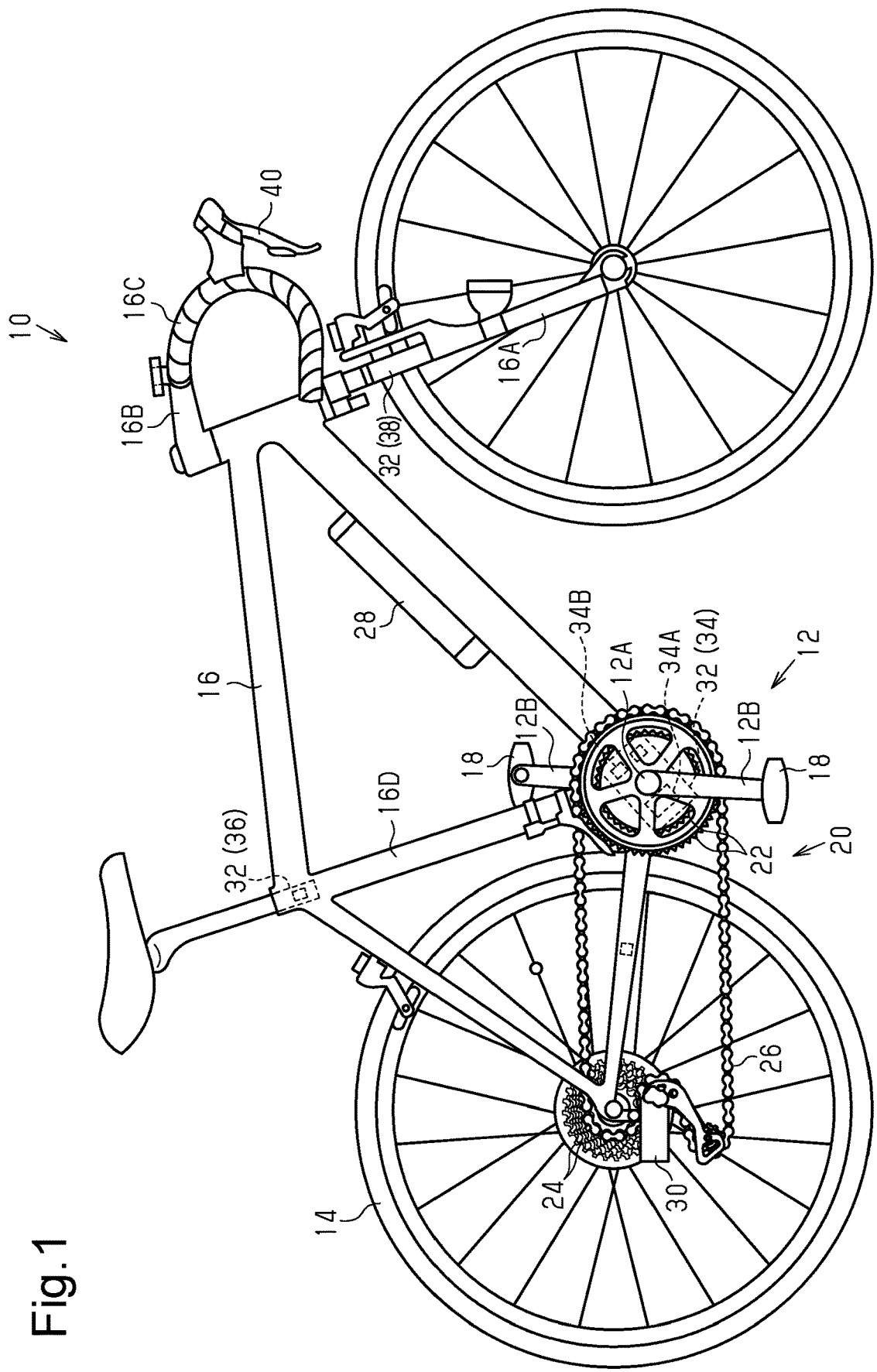
FIG. 1 is a side view of a human-powered vehicle including an electronic device in accordance with a first embodiment.
Figure 2:
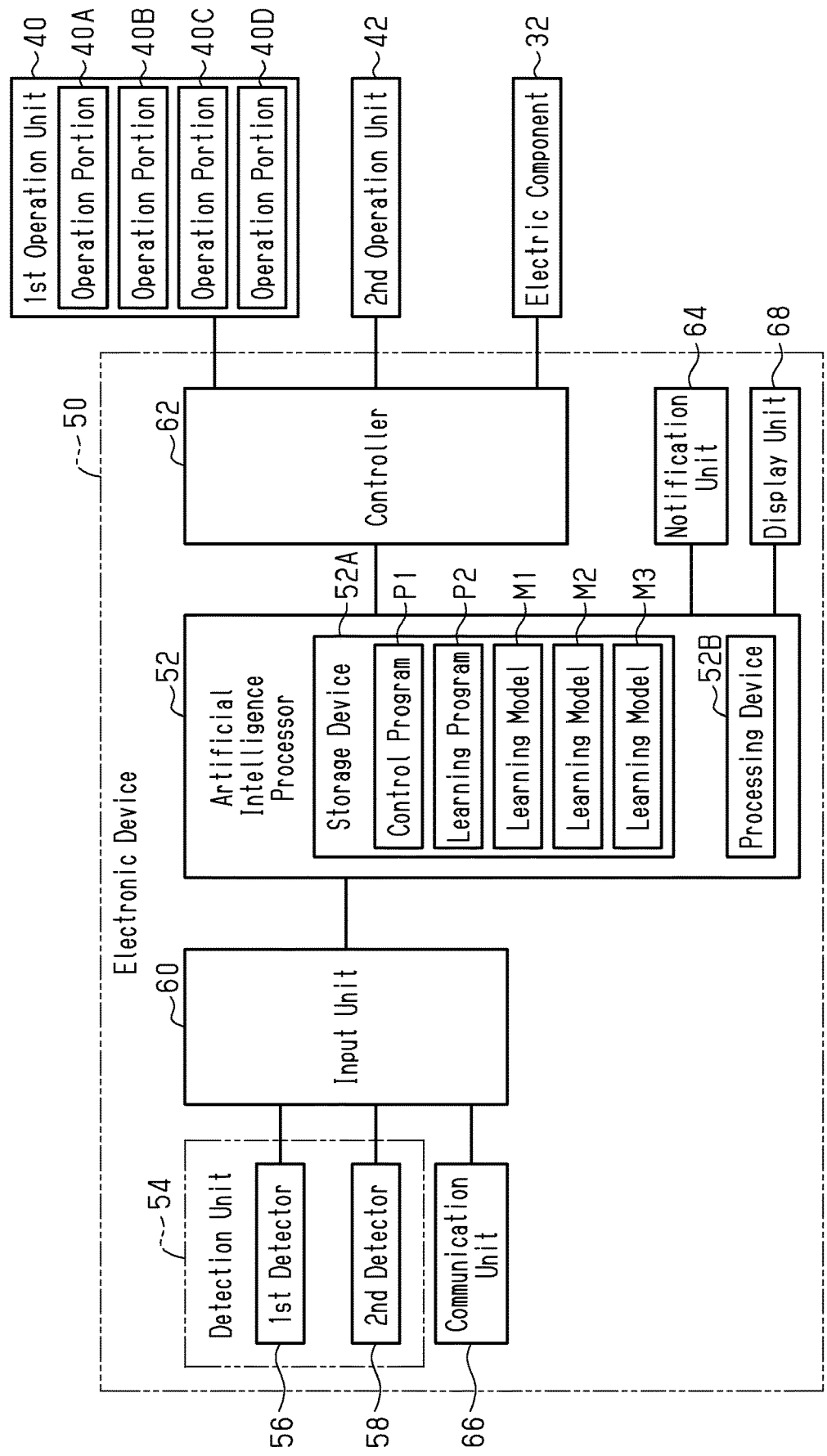
FIG. 2 is a block diagram showing an electrical configuration of the electronic device of FIG. 1.
Figure 3:
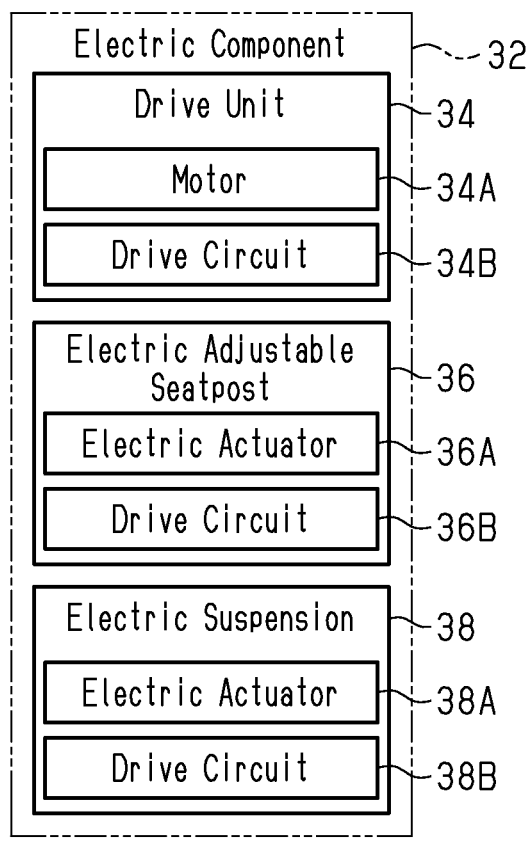
FIG. 3 is a block diagram showing the configuration of an electric component shown in FIG. 2.

The expression "at least one" as used in the present specification means "one or more" of the desired options. As an example, the expression "at least one" as used in the present specification means "only one option" or "both of two options" if the number of options is two. As another example, the expression "at least one" as used in the present specification means "only one option" or "combination of two or more arbitrary options" if the number of options is three or more.

First Embodiment

An electronic device 50 in accordance with a first embodiment will now be described with reference to FIGS. 1 to 8. The electronic device 50 is for use with a human-powered vehicle 10. The human-powered vehicle 10 is a vehicle that is configured to be driven by at least human driving force. The human-powered vehicle 10 includes, for example, a bicycle. There is no limit to the number of wheels of the human-powered vehicle 10. Thus, the human-powered vehicle 10 includes a unicycle and a vehicle having, for example, three or more wheels. The human-powered vehicle includes various types of bicycles such as a mountain bike, a road bike, a city bike, a cargo bike, a recumbent bike, and an electric bicycle (E-bike). The electric bicycle includes an electric assist bicycle that assists propulsion of the vehicle with an electric motor. Hereinafter, the human-powered vehicle 10 will be described as a bicycle in the embodiment.

The human-powered vehicle 10 includes a crank 12 and a drive wheel 14. The human-powered vehicle 10 further includes a frame 16. Human driving force is input to the crank 12. The crank 12 includes a crankshaft 12A rotatable relative to the frame 16 and crank arms 12B respectively provided at the axial ends of the crankshaft 12A. A pedal 18 is connected to each crank arm 12B. The drive wheel 14 is driven by the rotation of the crank 12. The drive wheel 14 is supported by the frame 16. The crank 12 and the drive wheel 14 are connected by a drive mechanism 20. The drive mechanism 20 includes a first rotary body 22 coupled to the crankshaft 12A. The crankshaft 12A and the first rotary body 22 can be coupled by a first one-way clutch. The first one-way clutch is configured to rotate the first rotary body 22 forward in a case where the crank 12 rotates forward and not rotate the first rotary body 22 backward in a case where the crank 12 rotates backward. The first rotary body 22 includes a sprocket, a pulley, or a bevel gear. The drive mechanism 20 further includes a second rotary body 24 and a linking member 26. The linking member 26 transmits the rotational force of the first rotary body 22 to the second rotary body 24. The linking member 26 includes, for example, a chain, a belt, or a shaft.

The second rotary body 24 is connected to the drive wheel 14. The second rotary body 24 includes a sprocket, a pulley, or a bevel gear. Preferably, a second one-way clutch is provided between the second rotary body 24 and the drive wheel 14. The second one-way clutch is configured to rotate the drive wheel 14 forward in a case where the second rotary body 24 rotates forward and not rotate the drive wheel 14 backward in a case where the second rotary body 24 rotates backward.

The human-powered vehicle 10 includes a front wheel and a rear wheel. The front wheel is attached to the frame 16 by a front fork 16A. A handlebar 16C is connected to the front fork 16A by a stem 16B. In the embodiment described hereafter, the rear wheel will be described as the drive wheel 14. However, the front wheel can be the drive wheel 14.

The human-powered vehicle 10 further includes a battery device 28. The battery device 28 includes one or more battery cells. The battery cell includes a rechargeable battery. The battery device 28 is provided on the human-powered vehicle 10 and supplies power to other electric components electrically connected by wires to the battery device 28, such as an electronic device 50 and an electric component 32. The battery device 28 is connected to the electric component 32 to communicate with the electric component 32 through wired or wireless connection. The battery device 28 is configured to communicate with the electronic device 50 and the electric component 32, for example, through power line communication (PLC). The battery device 28 can be attached to the outside of the frame 16 or can be at least partially accommodated in the frame 16. The battery device 28 can be provided in the electronic device 50 and the electric component 32.

Preferably, the human-powered vehicle 10 further includes an electric transmission 30. The rotary body to which the human driving force is input includes the crank 12. The electric transmission 30 is configured to be driven by an electric actuator. The electric actuator includes an electric motor. The electric transmission 30 is used to change a ratio of a rotational speed of the drive wheel 14 to a rotational speed of the crank 12. In the present embodiment, the electric transmission 30 is configured to change, in steps, the ratio of the rotational speed of the drive wheel 14 to the rotational speed of the crank 12. The electric actuator has the electric transmission 30 perform a shift operation. The electric actuator is connected to the electronic device 50 to communicate with the electronic device 50 through wired or wireless connection. The electric actuator is configured to communicate with an artificial intelligence processor 52, for example, through power line communication (PLC). The electric actuator has the electric transmission 30 perform a shift operation in accordance with a control signal from the electronic device 50. The electric transmission 30 includes at least one of an internal transmission device and an external transmission device (derailleur).

The electronic device 50 includes the artificial intelligence processor 52. The artificial intelligence processor 52 is configured to generate second information for controlling the electric component 32 in accordance with first information related to at least one of the human-powered vehicle 10, the rider of the human-powered vehicle 10, and the environment of the human-powered vehicle 10. The electric component 32 includes at least one of a drive unit 34 for applying propulsion force to the human-powered vehicle 10, an electric adjustable seatpost 36, and an electric suspension 38. The artificial intelligence processor 52 is configured to change the process for generating the second information in accordance with the first information and the operation of a first operation unit 40 for operating at least one of the drive unit 34, the electric adjustable seatpost 36, and the electric suspension 38.

The electronic device 50 can be a component provided on the human-powered vehicle. The electronic device 50 can also be a smartphone, a tablet computer, a personal computer, or a server. The component includes at least one of the electric component 32, the battery device 28, the electric transmission 30, and a cycle computer.

Preferably, the human-powered vehicle 10 further includes the electric component 32.

The drive unit 34 includes a motor 34A. The drive unit 34 further includes a drive circuit 34B. Preferably, the motor 34A and the drive circuit 34B are provided on the same housing. The drive circuit 34B controls the electric power supplied from the battery device 28 to the motor 34A. The drive circuit 34B is connected to a controller 62 to communicate with the controller 62 through wired or wireless connection. The drive circuit 34B is configured to communicate with the controller 62 through, for example, serial communication. The drive circuit 34B drives the motor 34A in accordance with a control signal from the controller 62. The motor 34A includes an electric motor. The motor 34A is provided in a power transmission path of the human driving force from the pedal 18 to the rear wheel or provided to transmit rotation to the front wheel. The motor 34A is provided on the frame 16, the rear wheel, or the front wheel of the human-powered vehicle 10. In one example, the motor 34A is coupled to a power transmission path from the crankshaft 12A to the first rotary body 22. Preferably, a one-way clutch is provided in the power transmission path between the motor 34A and the crankshaft 12A so that the motor 34A is not rotated by the rotational force of the crank 12 in a case where the crankshaft 12A is rotated in the direction in which the human-powered vehicle 10 moves forward. The housing on which the motor 34A and the drive circuit 34B are provided can include components other than the motor 34A and the drive circuit 34B, and, for example, can be provided with a reduction gear that decelerates and outputs the rotation of the motor 34A.

The electric adjustable seatpost 36 includes an electric actuator 36A. The electric adjustable seatpost 36 further includes a drive circuit 36B that controls the electric power supplied to the electric actuator 36A. The electric actuator 36A includes an electric motor. The electric motor included in the electric actuator 36A can be replaced by a solenoid. The drive circuit 36B drives the electric actuator 36A in accordance with a control signal from the controller 62. The electric adjustable seatpost 36 is provided on a seat tube 16D and is configured to change the height of the saddle. The electric adjustable seatpost 36 includes an electric seatpost, in which the seatpost is extended or retraced by the force of the electric actuator, or a mechanical seatpost, in which the seatpost is extended with at least one of the force of a spring and pneumatic force controlling with a valve by the electric actuator 36A and retracted using manual force. The mechanical seatpost includes a hydraulic seatpost or a hydraulic-pneumatic seatpost.

The electric suspension 38 includes an electric actuator 38A for operating the electric suspension 38. The electric suspension 38 further includes a drive circuit 38B that controls the electric power supplied to the electric actuator 38A. The electric actuator 38A includes an electric motor. The electric motor included in the electric actuator 38A can be replaced by a solenoid. The drive circuit 38B drives the electric actuator 38A in accordance with a control signal from the controller 62. The electric suspension 38 includes at least one of a front suspension and a rear suspension. The electric suspension 38 absorbs an impact applied to the wheel. The electric suspension 38 can be a hydraulic suspension or an air suspension. The electric suspension 38 includes a first portion and a second portion that is fitted to the first portion and movable relative to the first portion. The operational state of the electric suspension 38 includes a locked state that restricts relative movement between the first portion and the second portion and an unlocked state that permits relative movement between the first portion and the second portion. The electric actuator 38A switches the operational state of the electric suspension 38. The locked state of the electric suspension 38 is configured to include a state where the first portion and the second portion move slightly relative to each other in a case where a strong force is applied to the wheel. Instead of or in addition to the locked state and the unlocked state, the operational state of the electric suspension 38 can include at least one of a plurality of operational states with different damping forces and a plurality of operational states with different stroke amounts.

The rear suspension is configured to be provided on the frame 16 of the human-powered vehicle 10. More specifically, the rear suspension is provided between a frame body of the frame 16 and a swing arm that supports the rear wheel. The rear suspension absorbs the impact applied to the rear wheel. The front suspension is configured to be provided between the frame 16 of the human-powered vehicle 10 and the front wheel. More specifically, the front suspension is provided on the front fork 16A. The front suspension absorbs the impact applied to the front wheel.

The artificial intelligence processor 52 includes a storage device 52A storing software and a processing device 52B that executes software stored in the storage device 52A. The processing device 52B includes, for example, a central processing unit (CPU) or a micro-processing unit (MPU). Preferably, the processing device 52B includes a graphics processing unit (GPU) in addition to the CPU or the MPU. The processing device 52B can include a field-programmable gate array (FPGA). The artificial intelligence processor 52 can include one or more processing devices 52B. The artificial intelligence processor 52 can include a plurality of processing devices 52B located at separate positions. The processing device 52B executes a control program P1 stored in the storage device 52A.

The storage device 52A includes, for example, a nonvolatile memory and a volatile memory. The storage device 52A stores control program P1, learning program P2, and learning model M1. The storage device 52A can store learning model M2. The storage device 52A can store a learning model M3. In the present embodiment, learning models M1, M2, M3 are learned models learned by a predetermined learning algorithm. The learning algorithm includes machine learning, deep learning or deep reinforcement learning. The learning algorithm includes, for example, at least one of supervised learning, unsupervised learning, and reinforcement learning. As a learning algorithm, methods other than the method described in the present specification can used as long as learning models M1, M2, M3 can be updated using a method belonging to the field of artificial intelligence. Preferably, the learning process for updating learning models M1, M2, M3 is performed by the GPU. The learning algorithm can use a neural network (NN). The learning algorithm can use a recurrent neural network. The artificial intelligence processor 52 operates in the learning mode and the control mode. In a case where the artificial intelligence processor 52 operates in the learning mode, the artificial intelligence processor 52 generates learning models M1, M2, M3 with the learning algorithm based on learning program P2. In a case where the artificial intelligence processor 52 operates in the control mode, the artificial intelligence processor 52 outputs the second information by processing the first information acquired by the detection unit 54 using learning models M1, M2, M3 based on the control program P1.

Preferably, the human-powered vehicle 10 further includes a first operation unit 40. The first operation unit 40 is connected to the electronic device 50 to communicate with the electronic device 50 through wired or wireless connection. The first operation unit 40 is configured to communicate with the electronic device 50 through, for example, power line communication (PLC). The first operation unit 40 includes, for example, an operation member, a detection unit that detects the movement of the operation member, and an electric circuit that communicates with the electronic device 50 in accordance with an output signal of the detection unit. In a case where the operation member is operated by a user, the electric circuit transmits a signal corresponding to the output signal of the detection unit to the electronic device 50. The operation member and the detection unit that detects the movement thereof are configured including a push switch, a lever type switch, or a touch panel. The first operation unit 40 is provided, for example, on the handlebar 16C. The first operation unit 40 includes a wireless communication unit in a case where the first operation unit 40 is connected to the electronic device 50 to communicate with the electronic device 50 through wireless connection. The first operation unit 40 includes at least one of an operation portion 40A for operating the electric transmission 30, an operation portion 40B for changing the operational state of the drive unit 34 for assisting the propulsion of the human-powered vehicle 10, an operation portion 40C for changing the operational state of the electric adjustable seatpost 36, and an operation portion 40D for changing the operational state of the electric suspension 38. The operation portion 40A includes, for example, an operation portion for changing the transmission ratio of the human-powered vehicle 10. The operation portion 40B includes, for example, an operation portion for changing the operation mode of the drive unit 34. The operation mode of the drive unit 34 includes a plurality of operation modes with different assist forces by the motor 34A. The operation portion 40C includes, for example, an operation portion for changing the height of the electric adjustable seatpost 36. The operation portion 40D includes, for example, an operation portion for changing the hardness of the electric suspension 38.

The electronic device 50 further includes a detection unit 54 that detects the first information. Preferably, the detection unit 54 includes a first detector 56 provided to the human-powered vehicle 10 and a second detector 58 provided outside the human-powered vehicle 10. In a case where the detection unit 54 includes the first detector 56, the first information includes information related to the human-powered vehicle 10 on which the electronic device 50 is provided. In a case where the detection unit 54 includes the second detector 58, the first information includes information accumulated in an external device. The information stored in the external device can include information related to a single human-powered vehicle 10 or information related to a plurality of human-powered vehicles 10. Preferably, the first detector 56 and the second detector 58 detect different information.

Preferably, the electronic device 50 further includes an input unit 60. Preferably, the input unit 60 is provided on the same housing as the artificial intelligence processor 52. At least one of the first detector 56 and the second detector 58 can be provided on a housing on which the artificial intelligence processor 52 is provided or on a housing differing from the housing on which the artificial intelligence processor 52 is provided. The outputs of the first detector 56 and the second detector 58 are input to the input unit 60. The first detector 56 and the second detector 58 can be electrically connected to the input unit 60 by an electric cable or through wireless communication.

Preferably, an output signal of the first operation unit is input to the controller 62. In a case where the first operation unit 40 is operated, one of the output signal of the first operation unit 40 and the input history of the output signal of the first operation unit 40 is input to the artificial intelligence processor 52 through the controller 62. The output signal of the first operation unit 40 can be input to the artificial intelligence processor 52 without passing through the controller 62. The controller 62 is configured to control at least one of the electric transmission 30 and the electric component 32 in accordance with an output signal of the first operation unit 40. The controller 62 operates the electric transmission 30 in a case where the operation portion 40A is operated. The controller 62 changes the operational state of the drive unit 34 in a case where the operation portion 40B is operated. The controller 62 changes the operational state of the electric adjustable seatpost 36 in a case where the operation portion 40C is operated. The controller 62 changes the operational state of the electric suspension 38 in a case where the operation portion 40D is operated.

The first information related to the human-powered vehicle 10 includes at least one of information related to the electric transmission 30 for changing the transmission ratio of the human-powered vehicle 10, information related to the transmission ratio changed by the electric transmission 30, information related to the vehicle speed of the human-powered vehicle 10, information related to the rotational speed of the crank 12 of the human-powered vehicle 10, information related to the human driving force input to the human-powered vehicle 10, and information related to the inclination of the human-powered vehicle 10.

The transmission ratio changed by the electric transmission 30 is the ratio of the rotational speed of the drive wheel 14 to the rotational speed of the rotary body to which the human driving force is input. The transmission ratio corresponds to the ratio of the rotational speed of the crank 12 to the rotational speed of the wheel.

Preferably, in a case where the first information includes information related to the electric transmission 30, the first detector 56 includes a state detection sensor that detects the state of the electric transmission 30. The state detection sensor detects the current shift stage of the electric transmission 30. The state detection sensor detects physical movement of the electric transmission 30, the electric actuator, and the like. The state detection sensor includes, for example, a sensor such as a potentiometer or a Hall element.

In a case where the first information includes information related to the transmission ratio, the first detector 56 includes a vehicle speed sensor and a crank rotation sensor. The vehicle speed sensor is used to detect the rotational speed of the wheel of the human-powered vehicle 10. The vehicle speed sensor outputs a signal corresponding to the rotational speed of the wheel. The crank rotation sensor is used to detect a rotational speed of the crank 12. The crank rotation sensor outputs a signal corresponding to the rotational speed of the crank 12. In a case where the first information includes information related to the transmission ratio, the first detector 56 can include at least one of a detection unit that detects the control signal transmitted from a controller configured to control the electric transmission 30 and a detection unit that detects an operation signal of the operation portion 40A for operating the electric transmission 30.

Preferably, in a case where the first information includes information related to the vehicle speed, the first detector 56 includes a vehicle speed sensor. The vehicle speed sensor is used to detect the rotational speed of the wheel of the human-powered vehicle 10. The vehicle speed sensor outputs a signal corresponding to the rotational speed of the wheel. The controller 62 calculates the vehicle speed of the human-powered vehicle 10 based on the rotational speed of the wheel. Preferably, the vehicle speed sensor includes a magnetic reed forming a reed switch or a Hall element. The vehicle speed sensor can be mounted on a chain stay of the frame 16 of the human-powered vehicle 10 to detect a magnet attached to the rear wheel or can be provided on the front fork 16A to detect a magnet attached to the front wheel. In a case where the first information includes information related to the vehicle speed, the first detector 56 does not have to include the vehicle speed sensor and can include a global positioning system (GPS) receiver and a storage unit that stores map information. In a case where the first information includes information related to the vehicle speed, the second detector 58 can include a GPS receiver and a storage unit that stores map information. In this case, the controller 62 can calculate the vehicle speed of the human-powered vehicle 10 in accordance with the position information received by the GPS receiver, the map information, and the timer included in the controller 62.

Preferably, in a case where the first information includes information related to the rotational speed of the crank 12, the first detector 56 includes a crank rotation sensor. The crank rotation sensor is used to detect the rotational speed of the crank 12. The crank rotation sensor is attached to the housing of the frame 16 or the drive unit 34 of the human-powered vehicle 10. The crank rotation sensor is configured to include a magnetic sensor that outputs a signal corresponding to the intensity of the magnetic field. An annular magnet of which magnetic field intensity changes in the circumferential direction is provided on the crankshaft 12A, on a member that rotates in cooperation with the crankshaft 12A, or in a power transmission path between the crankshaft 12A and the first rotary body 22. The crank rotation sensor outputs a signal corresponding to the rotational speed of the crank 12. The magnet can be provided on a member that rotates integrally with the crankshaft 12A in the power transmission path of the human driving force from the crankshaft 12A to the first rotary body 22. For example, the magnet can be provided on the first rotary body 22 in a case where the first one-way clutch is not provided between the crankshaft 12A and the first rotary body 22. The crank rotation sensor can include an optical sensor, an acceleration sensor, or a torque sensor instead of the magnetic sensor.

Preferably, in a case where the first information includes the human driving force, the first detector 56 includes a torque sensor. The torque sensor is used to detect torque of the human driving force input to the crank 12. For example, in a case where the first one-way clutch is provided in the power transmission path, the torque sensor is provided on the upstream side of the first one-way clutch in the power transmission path. The torque sensor includes a strain sensor, a magnetostrictive sensor, a pressure sensor, or the like. The strain sensor includes a strain gauge. The torque sensor is provided in the power transmission path or on a member included in the vicinity of a member included in the power transmission path. The member included in the power transmission path is, for example, the crankshaft 12A, the crank arm 12B, or the pedal 18. The torque sensor can include a wireless or wired communication unit. The human driving force can include the power of the human driving force. Preferably, in this case, the first detector 56 includes a torque sensor and a crank rotation sensor.

Preferably, in a case where the first information includes information related to the inclination of the human-powered vehicle 10, the first detector 56 includes an inclination sensor. The inclination sensor is provided on the human-powered vehicle 10 and detects the inclination angle of the human-powered vehicle 10. The inclination angle of the human-powered vehicle 10 includes at least one of a pitch angle, a roll angle, and a yaw angle. The inclination sensor includes, for example, at least one of a gyro sensor and an acceleration sensor.

The information related to the rider of the human-powered vehicle includes biological information of the rider. Preferably, in a case where the first information includes the physical condition of the rider, the second detector 58 includes at least one of a heart rate sensor, an electroencephalogram sensor, and a myoelectric sensor.

The information related to the environment of the human-powered vehicle 10 includes the information related to the traveling route of the human-powered vehicle 10. Preferably, in a case where the first information includes information related to the traveling route of the human-powered vehicle 10, at least one of the first detector 56 and the second detector 58 includes a GPS receiver and a storage unit for storing map information. The map information can be acquired from an external device electrically connected to at least one of the first detector 56 and the second detector 58.

A process for generating the second information in accordance with the first information will now be described with reference to FIG. 4. In a case where electric power is supplied to the artificial intelligence processor 52 and the control mode is set, the artificial intelligence processor 52 starts the process and proceeds to step S11 of the flowchart shown in FIG. 4.

In step S11, the artificial intelligence processor 52 determines whether or not the first information has been input. In a case where the first information has not been input, the artificial intelligence processor 52 ends the process. In a case where the first information has been input, the artificial intelligence processor 52 proceeds to step S12. In step S12, the artificial intelligence processor 52 generates the second information by processing the first information using learning model M1 based on the control program P1 and then ends the process. The artificial intelligence processor 52 proceeds to step S11 after a predetermined cycle has elapsed from the end of the flowchart shown in FIG. 4 until the supply of electric power is stopped.

Figure 5:
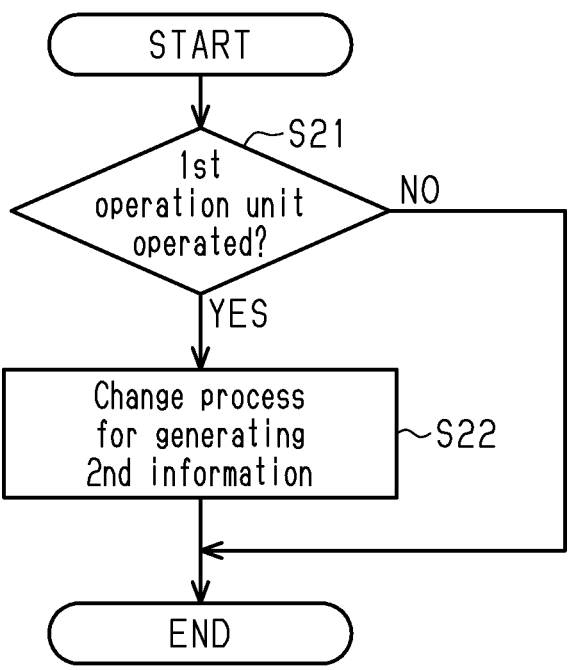
FIG. 5 is a flowchart of a process for changing the process for generating the second information executed by the artificial intelligence processor of FIG. 2.

A process for changing the process for generating the second information will now be described with reference to FIG. 5. In a case where electric power is supplied to the artificial intelligence processor 52 and the learning mode is set, the artificial intelligence processor 52 starts the process and proceeds to step S21 of the flowchart shown in FIG. 5.

In step S21, the artificial intelligence processor 52 determines whether or not the first operation unit 40 has been operated. In a case where the first operation unit 40 has not been operated, the artificial intelligence processor 52 ends the process. In a case where the first operation unit 40 has been operated, the artificial intelligence processor 52 proceeds to step S22. In step S22, the artificial intelligence processor 52 changes the process for generating the second information and then ends the process. In step S22, the artificial intelligence processor 52 updates learning model M1 for generating the second information using the first information with learning model M1 based on learning program P2. The artificial intelligence processor 52 proceeds to step S21 after a predetermined cycle has elapsed from the end of the flowchart shown in FIG. 5 until the supply of electric power is stopped.

Figure 4:
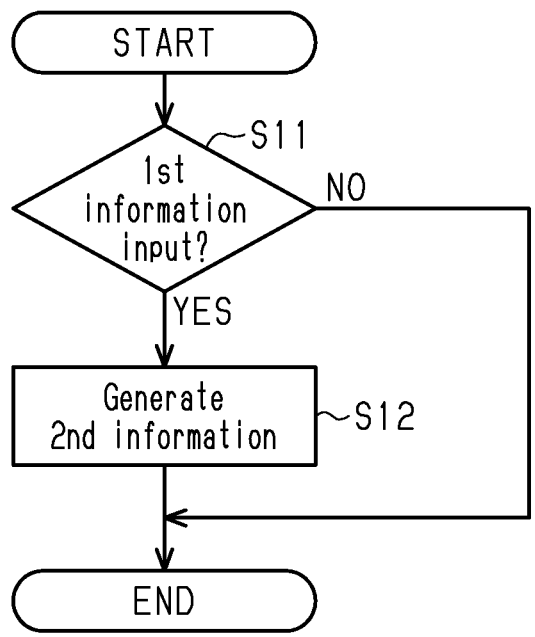
FIG. 4 is a flowchart of a process for generating second information in accordance with first information executed by an artificial intelligence processor of FIG. 2.

The artificial intelligence processor 52 performs the process for generating the second information of FIG. 4 using the process for generating the second information that has been changed in step S22. The information related to the process for generating the second information is stored in the storage device 52A of the artificial intelligence processor 52 in a changeable manner. The information related to the process for generating the second information includes at least one of weighting and biasing in learning model M1.

The artificial intelligence processor 52 performs learning using a combination of the operation of the first operation unit 40 and the first information in a case where the operation of the first operation unit 40 is performed to control of the electric component 32 in accordance with the preferences of the rider.

In the present embodiment, the artificial intelligence processor 52 operates in the learning mode and the control mode. The artificial intelligence processor 52 operates in the control mode in a case supplied with electric power. In a case where the artificial intelligence processor 52 operates in the learning mode, the artificial intelligence processor 52 generates learning model M1 with the learning algorithm based on learning program P2. In a case where the artificial intelligence processor 52 operates in the control mode, the artificial intelligence processor 52 outputs the second information by processing the first information acquired by the detection unit 54 with learning model M1 based on the control program P1.

The electronic device 50 includes the controller 62 configured to control at least one of the drive unit 34, the electric adjustable seatpost 36, and the electric suspension 38. The controller 62 is configured to operate in a first control state for controlling at least one of the drive unit 34, the electric adjustable seatpost 36, and the electric suspension 38 in accordance with the second information, and a second control state for controlling at least one of the drive unit 34, the electric adjustable seatpost 36, and the electric suspension 38 in accordance with the operation of the first operation unit 40. In the first control state, the electronic device 50 can control the drive unit 34, the electric adjustable seatpost 36, and the electric suspension 38 in accordance with the operation of the first operation unit 40. In the second control state, the electronic device 50 does not control the drive unit 34, the electric adjustable seatpost 36, and the electric suspension 38 in accordance with the second information.

The controller 62 includes a processing device that executes a control program defined in advance. The processing device includes, for example, a CPU or an MPU. The controller 62 can include one or more microcomputers. The controller 62 can include a storage unit. The storage unit includes, for example, a nonvolatile memory and a volatile memory. The controller 62 controls the electric component 32.

In the first control state, the controller 62 controls the drive unit 34 in accordance with at least one of, for example, the vehicle speed, the rotational speed of the crank 12, and the human driving force.

Preferably, the controller 62 switches between the first control state and the second control state in accordance with the operation of the second operation unit 42. The artificial intelligence processor 52 can be configured to operate in the learning mode in the second control state and configured to operate in the control mode in the first control state. Preferably, in a case where the artificial intelligence processor 52 is configured to operate in the learning mode in the second control state and configured to operate in the control mode in the first control state, the artificial intelligence processor 52 switches to the control mode and the learning mode in accordance with the operation of the second operation unit 42.

Preferably, the human-powered vehicle 10 further includes the second operation unit 42. The second operation unit 42 is connected to the electronic device 50 to communicate with the electronic device 50 through wired or wireless connection. The second operation unit 42 is configured to communicate with the electronic device 50 through, for example, power line communication (PLC). The second operation unit 42 includes, for example, an operation member, a detection unit that detects the movement of the operation member, and an electric circuit that communicates with the electronic device 50 in accordance with an output signal of the detection unit. The electric circuit transmits an output signal to the electronic device 50 if the user operates the operation member. The second operation member and the detection unit that detects movement of the second operation member are configured by a push switch, a lever type switch, or a touch panel. The second operation unit 42 is provided, for example, on the handlebar 16C.

Preferably, an output signal of the second operation unit 42 is input to the controller 62. In a case where the second operation unit 42 is operated, one of the output signal of the second operation unit 42 and the input history of the output signal of the second operation unit 42 is input to the artificial intelligence processor 52 through the controller 62. The output signal of the second operation unit 42 can be input to the artificial intelligence processor 52 without passing through the controller 62.

Figure 6:
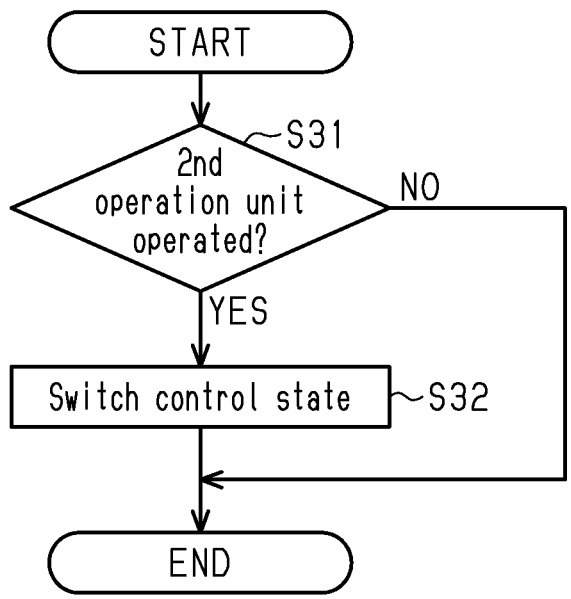
FIG. 6 is a flowchart of a process for switching a control state executed by a controller of FIG. 2.

A process for changing the process for switching between the first control state and the second control state will now be described with reference to FIG. 6. In a case where electric power is supplied to the controller 62, the controller 62 starts the process and proceeds to step S31 of the flowchart shown in FIG. 6.

In step S31, the controller 62 determines whether or not the second operation unit 42 has been operated. In a case where the second operation unit 42 has not been operated, the controller 62 ends the process. In a case where the second operation unit 42 has been operated, the controller 62 proceeds to step S32. In step S32, the controller 62 switches the control state and ends the process. For example, the controller 62 switches to the second control state in a case where the second operation unit 42 is operated in the first control state and switches to the first control state in a case where the second operation unit 42 is operated in the second control state.

In a case where the first control state and the second control state are switched, the controller 62 issues a notification with a notification unit 64. Preferably, the electronic device 50 further includes the notification unit 64. The notification unit 64 includes at least one of a speaker and a display device. The display device includes at least one of a liquid crystal and an organic electro-luminescence (EL) display. The display device can be a touch panel. The notification unit 64 does not have to be included in the electronic device 50 and can be included in an external device that is separate from the electronic device 50. In this case, the notification unit 64 is configured to communicate with the electronic device 50.

The electronic device 50 can further include a communication unit 66, and the artificial intelligence processor 52 can receive the first information via the communication unit 66. The communication unit 66 is configured to communicate through, for example, at least one of a wireless local area network (LAN) and a public communication network. The communication unit 66 includes at least one of a wireless communication unit and a wired communication unit. The communication unit 66 can be connected to the Internet to receive the first information via the Internet. The communication unit 66 can transmit the first information to the artificial intelligence processor 52 through the input unit 60 or transmit the first information to the artificial intelligence processor 52 without the input unit 60.

The artificial intelligence processor 52 can generate a proposal related to a component of the human-powered vehicle 10 in accordance with the first information. Preferably, in this case, the electronic device 50 further includes a display unit 68 for displaying the proposal related to the component of the human-powered vehicle 10. The display unit 68 includes at least one of a liquid crystal and an organic EL display. The display unit 68 can be a touch panel. In a case where the notification unit 64 includes a display device, the display device of the notification unit 64 can be used as the display unit 68.

The artificial intelligence processor 52 generates a proposal related to a component of the human-powered vehicle 10 suitable for the traveling of the rider in accordance with the first information. In this case, the artificial intelligence processor 52 stores learning model M2 for generating a proposal related to a component of the human-powered vehicle 10 suitable for the traveling of the rider. For example, in a case where the artificial intelligence processor 52 determines from the first information that it would be more suitable for the rider if the change amount of the transmission ratio between shift stages is larger than the current change amount of the transmission ratio between shift stages, the artificial intelligence processor 52 shows on the display unit 68 the model number, the number of teeth, the combination of the number of teeth, or the like of at least one of the first rotary body 22 and the second rotary body 24. For example, in a case where the artificial intelligence processor 52 determines from the first information that it would be more suitable for the rider if the maximum transmission ratio is larger than the current maximum transmission ratio, the artificial intelligence processor 52 shows on the display unit 68 the model number, the number of teeth, the combination of the number of teeth, or the like of at least one of the first rotary body 22 and the second rotary body 24. For example, in a case where the artificial intelligence processor 52 determines from the first information that it would be more suitable for the rider if the minimum transmission ratio is larger than the current minimum transmission ratio, the artificial intelligence processor 52 shows on the display unit 68 the model number, the number of teeth, the combination of the number of teeth, or the like of at least one of the first rotary body 22 and the second rotary body 24.

Figure 7:
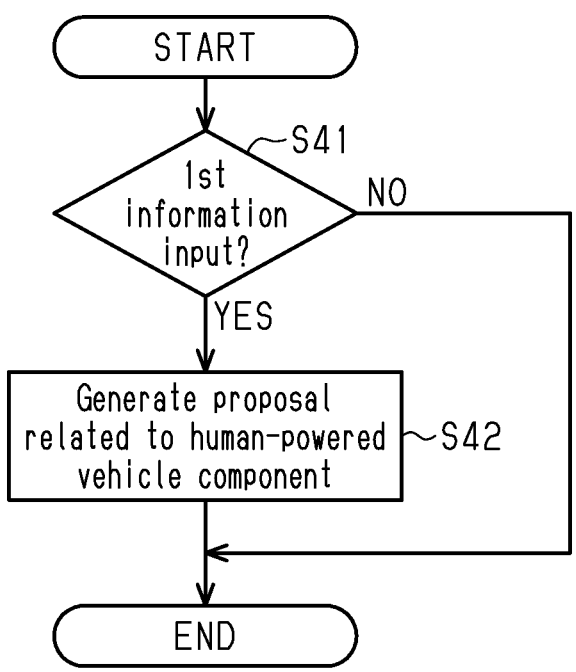
FIG. 7 is a flowchart of a process for generating a proposal related to a component of a human-powered vehicle executed by the artificial intelligence processor of FIG. 2.

A process for generating a proposal related to a component of the human-powered vehicle 10 will now be described with reference to FIG. 7. In a case where electric power is supplied to the artificial intelligence processor 52, the artificial intelligence processor 52 starts the process and proceeds to step S41 of the flowchart shown in FIG. 7.

In step S41, the artificial intelligence processor 52 determines whether or not the first information has been input. In a case where the first information has not been input in step S41, the artificial intelligence processor 52 ends the process. In a case where the first information has been input, the artificial intelligence processor 52 proceeds to step S42. In step S42, the artificial intelligence processor 52 generates a proposal related to a component of the human-powered vehicle 10 and then ends the process. In step S42, the artificial intelligence processor 52 updates learning model M2 for generating a proposal using the first information with the learning algorithm based on learning program P2, and generates the proposal using the updated learning model M2. The artificial intelligence processor 52 shows the proposal generated in step S42 on the display unit 68. The artificial intelligence processor 52 proceeds to step S41 after a predetermined cycle has elapsed from the end of the flowchart shown in FIG. 7 until the supply of electric power is stopped.

The artificial intelligence processor 52 can generate fourth information related to the setting of the human-powered vehicle 10 in accordance with the first information. The fourth information includes, for example, values of control parameters in the second control state. In this case, the artificial intelligence processor 52 stores a learning model M3 for generating the fourth information. For example, in a case where the artificial intelligence processor 52 determines from the first information that it is preferable that the height of the electric adjustable seatpost 36 when stopped be higher than the current set value, the set value of the height of the electric adjustable seatpost 36 when stopped is changed.

Figure 8:
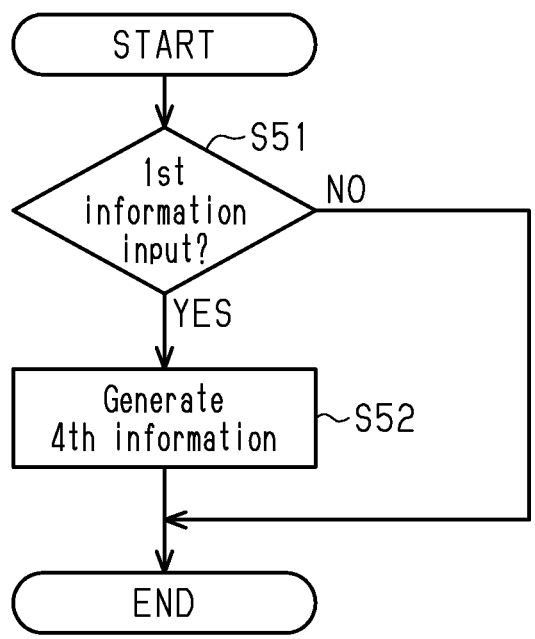
FIG. 8 is a flowchart of a process for changing the process for generating fourth information executed by the artificial intelligence processor of FIG. 2.

A process for generating the fourth information in accordance with the first information will now be described with reference to FIG. 8. In a case where electric power is supplied to the artificial intelligence processor 52, the artificial intelligence processor 52 starts the process and proceeds to step S51 of the flowchart shown in FIG. 8.

In step S51, the artificial intelligence processor 52 determines whether or not the first information has been input. In a case where the first information has not been input in step S51, the artificial intelligence processor 52 ends the process. In a case where the first information has been input, the artificial intelligence processor 52 proceeds to step S52. In step S52, the artificial intelligence processor 52 generates the fourth information and then ends the process. In step S52, the artificial intelligence processor 52 updates learning model M3 for generating the fourth information using the first information with the learning algorithm based on learning program P2. Further, the artificial intelligence processor 52 generates the fourth information using the updated learning model M3. The artificial intelligence processor 52 controls the electric component 32 using the information related to the setting generated in step S52.

Second Embodiment

Figure 9:
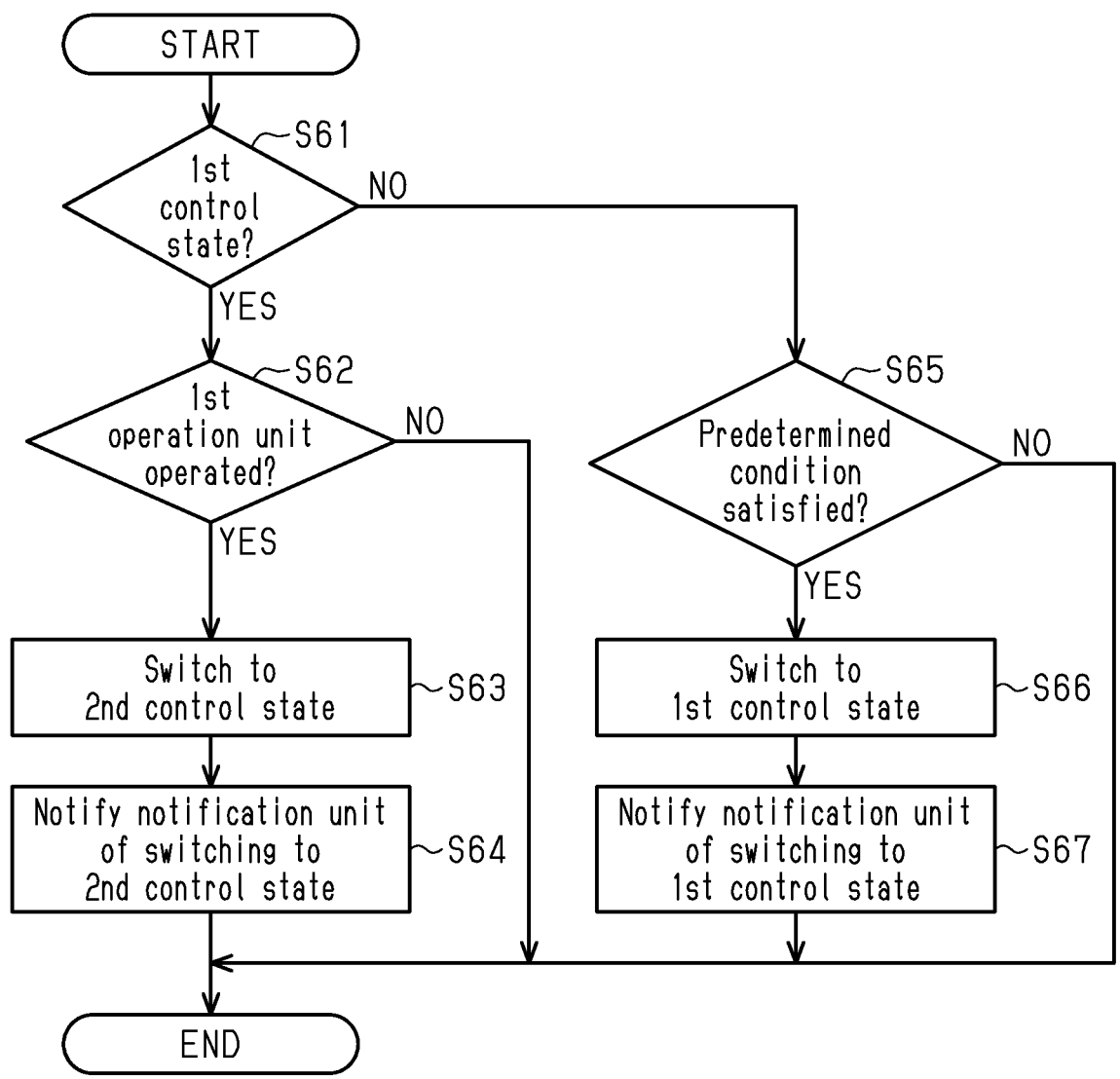
FIG. 9 is a flowchart of a process for switching a control state executed by a controller in accordance with a second embodiment.

An electronic device 50 in accordance with a second embodiment will now be described with reference to FIG. 9. The electronic device 50 in accordance with the second embodiment is similar to the electronic device 50 in accordance with the first embodiment except in the process for switching between the first control state and the second control state. Same reference numerals are given to those components that are the same as the corresponding components of the first embodiment. Such components will not be described in detail.

The controller 62 switches to the second control state in a case where the first operation unit 40 is operated in the first control state. Preferably, the controller 62 switches to the first control state in a case where a predetermined condition is satisfied in the second control state.

The predetermined condition can be satisfied, for example, in a case where the supply of electric power to the electronic device 50 is stopped. In this case, in a case where electric power is supplied to the electronic device 50 again and traveling is resumed, the control state is switched to the first control state. The predetermined condition can be satisfied in a case where the second operation unit 42 is operated.

A process for switching the control state will now be described with reference to FIG. 9. In a case where electric power is supplied to the controller 62, the controller 62 starts the process and proceeds to step S61 of the flowchart shown in FIG. 9.

In step S61, the controller 62 determines whether or not it is in the first control state. In a case the controller 62 is in first control state, the controller 62 proceeds to step S62. In step S62, the controller 62 determines whether or not the first operation unit 40 has been operated. In a case where the first operation unit 40 has not been operated, the controller 62 ends the process. In a case where the first operation unit 40 has been operated, the controller 62 proceeds to step S63.

In step S63, the controller 62 switches to the second control state and then proceeds to step S64. In step S64, the controller 62 notifies the notification unit 64 of the switching to the second control state and then ends the process.

In a case where it is determined in step S61 that the controller 62 is not in the first control state, the controller 62 proceeds to step S65. In step S65, the controller 62 determines whether or not a predetermined condition is satisfied. In a case where the predetermined condition is not satisfied, the controller 62 ends the process. In a case where the predetermined condition is satisfied, the controller 62 proceeds to step S66.

In step S66, the controller 62 switches to the first control state and proceeds to step S67. In step S67, the controller 62 notifies the notification unit 64 of the switching to the first control state and then ends the process.

Modified Examples

The description related with the above embodiments exemplifies, without any intention to limit, an applicable form of an electronic device in accordance with the present disclosure. In addition to the embodiments described above, the electronic device in accordance with the present disclosure is applicable to, for example, modified examples of the above embodiments that are described below and combinations of at least two of the modified examples that do not contradict each other. In the modified examples described hereafter, same reference numerals are given to those components that are the same as the corresponding components of the above embodiments. Such components will not be described in detail.

Figure 10:
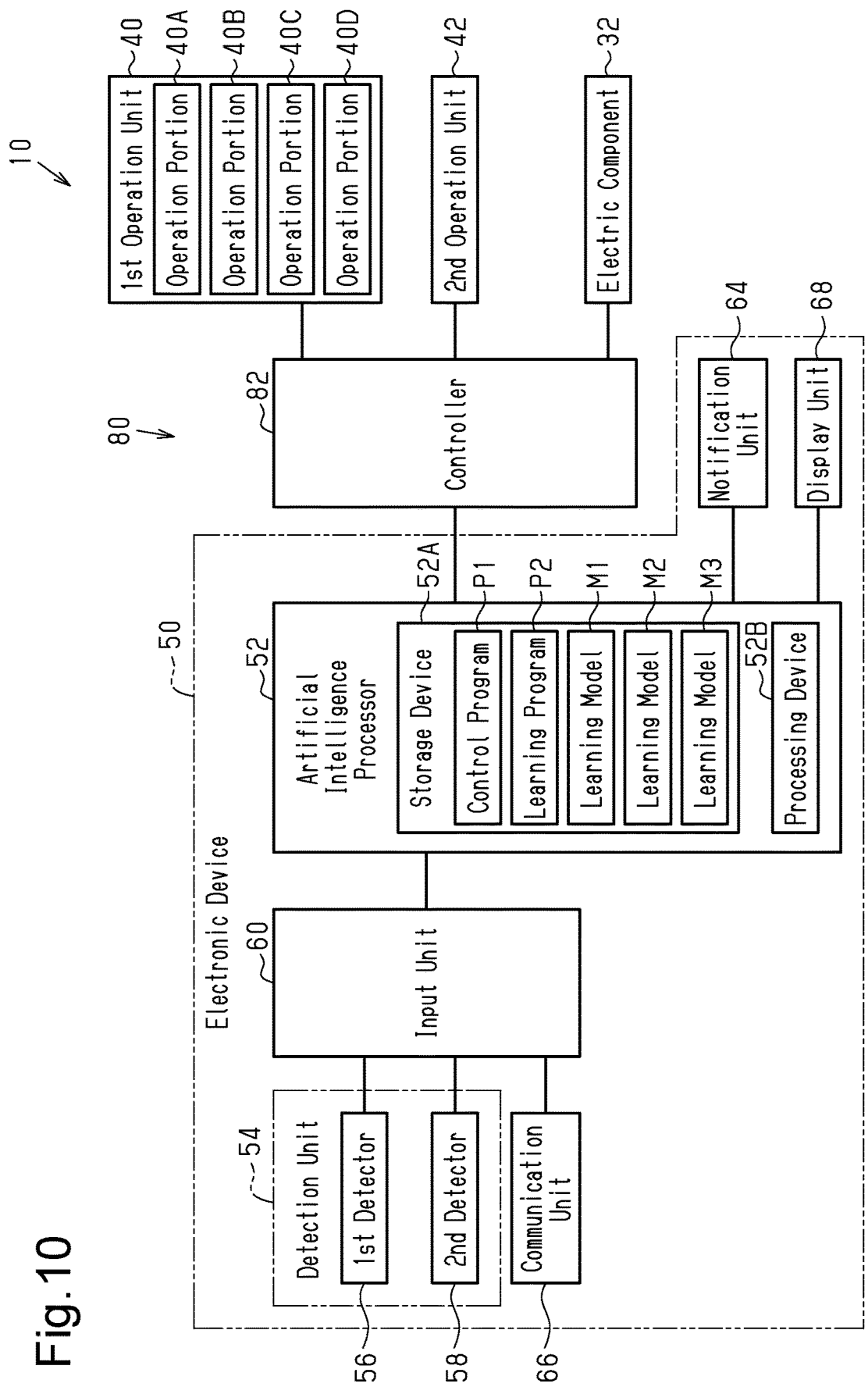
FIG. 10 is a block diagram showing the electrical configuration of a human-powered vehicle system including an electronic device in accordance with a modified example.

The electronic device 50 can be included in a human-powered vehicle system 80 shown in FIG. 10. The human-powered vehicle system 80 includes the electronic device 50 and a controller 82. The controller 82 configured to receive the third information related to the processing of the artificial intelligence processor 52 from the electronic device 50 and control the electric component in accordance with the first information and the third information. In this case, the controller 62 of the electronic device 50 can be omitted. The controller 82 can be provided separately from the electric component 32 or can be provided in the electric component 32. In this case, the electronic device 50 includes at least one of a smartphone, a tablet computer, a personal computer, and a server. The third information is similar to the second information.

The electric component 32 in accordance with a first modified example can include at least one of the electric transmission 30, the drive unit 34 for applying a propulsion of the human-powered vehicle 10, the electric adjustable seatpost 36, and the electric suspension 38. In this case, the electronic device 50 includes the artificial intelligence processor 52 that is configured to generate the second information for controlling the electric component 32 provided in the human-powered vehicle 10 in accordance with the first information related to at least one of the rider of the human-powered vehicle 10 and the environment of the human-powered vehicle 10. The artificial intelligence processor 52 is configured to change the process for generating the second information in accordance with the first information and the operation of the first operation unit 40 for operating the electric component 32.

In the first modified example, the electronic device 50 includes the controller 62 configured to control the electric component 32, and the controller 62 can be configured to operate in a first control state for controlling the electric component 32 in accordance with the second information, and a second control state for controlling the electric component 32 in accordance with the operation of the first operation unit 40.

The artificial intelligence processor 52 can switch between the control mode and the learning mode under conditions that differ from those of the second operation unit 42. For example, the electronic device 50 includes a third operation unit for switching between the control mode and the learning mode. The electronic device 50 is switched between the control mode and the learning mode by the operation of the third operation unit. In this case, the artificial intelligence processor 52 can generate the second information in accordance with the first information in a case of the first control state.

At least one of the first operation unit 40 and the second operation unit 42 can be provided in the electronic device 50.

DESCRIPTION OF REFERENCE CHARACTERS 10) human-powered vehicle, 12) crank, 30) electric transmission, 32) electric component, 34) drive unit, 36) electric adjustable seatpost, 38) electric suspension, 40) first operation unit, 42) second operation unit, 50) electronic device, 52) artificial intelligence processor, 54) detection unit, 56) first detector, 58) second detector, 62) controller, 64) notification unit, 66) communication unit, 68) display unit, 80) human-powered vehicle system, 82) controller

The invention claimed is:
1. An electronic device comprising:
an artificial intelligence processor including memory in which a learning model is stored; and
a controller configured to control an electric component including at least one of a drive unit that applies propulsion force to a human-powered vehicle, an electric adjustable seatpost, and an electric suspension, wherein the artificial intelligence processor is configured to generate second information for controlling the electric component using the learning model to process first information related to at least one of the human-powered vehicle, a rider of the human-powered vehicle, and an environment of the human-powered vehicle, the artificial intelligence processor is configured to change a process for generating the second information in accordance with the first information and in accordance with an operation of a first operation unit for operating the electric component by updating the learning model via a learning algorithm using a neural network, the first operation unit communicates with the electronic device through a wireless connection, and the controller controls the electric component via wireless communication.

2. The electronic device according to claim 1, further comprising a detection unit that detects the first information.

3. The electronic device according to claim 2, wherein the detection unit includes a first detector provided on the human-powered vehicle and a second detector provided outside the human-powered vehicle.

4. The electronic device according to claim 1, wherein the first information related to the human-powered vehicle includes at least one of information related to an electric transmission that changes a transmission ratio of the human-powered vehicle, information related to the transmission ratio changed by the electric transmission, information related to a vehicle speed of the human-powered vehicle, information related to a rotational speed of a crank of the human-powered vehicle, information related to human driving force input to the human-powered vehicle, and information related to an inclination of the human-powered vehicle.

5. The electronic device according to claim 1, wherein the first information related to the rider of the human-powered vehicle includes biological information of the rider.

6. The electronic device according to claim 1, wherein the first information related to the environment of the human-powered vehicle includes information related to a traveling route of the human-powered vehicle.

7. The electronic device according to claim 1, wherein, the controller is configured to operate in:
a first control state for controlling the at least one of the drive unit, the electric adjustable seatpost, and the electric suspension in accordance with the second information, and
a second control state for controlling the at least one of the drive unit, the electric adjustable seatpost, and the electric suspension in accordance with the operation of the first operation unit.

8. The electronic device according to claim 7, wherein the controller switches between the first control state and the second control state in accordance with an operation of a second operation unit.

9. The electronic device according to claim 7, wherein the controller is switched to the second control state in a case where the first operation unit is operated in the first control state.

10. The electronic device according to claim 7, wherein the controller switches to the first control state in a case where a predetermined condition is satisfied in the second control state.

11. The electronic device according to claim 7, wherein the controller issues a notification with a notification unit in a case where the first control state and the second control state are switched.

12. The electronic device according to claim 1, further comprising a communication unit,
wherein the first information is input to the artificial intelligence processor through the communication unit.

13. The electronic device according to claim 12, wherein the communication unit is connected to the Internet and receives the first information via the Internet.

14. The electronic device according to claim 1, wherein the artificial intelligence processor generates a proposal related to a component of the human-powered vehicle in accordance with the first information.

15. The electronic device according to claim 14, further comprising a display unit for displaying the proposal related to the component of the human-powered vehicle.

16. The electronic device according to claim 1, wherein the artificial intelligence processor generates fourth information related to a setting of the human-powered vehicle in accordance with the first information.

17. A human-powered vehicle system comprising:
the electronic device according to claim 1; and
a controller configured to receive third information related to a process of the artificial intelligence processor from the electronic device and control the electric component in accordance with the first information and the third information.

18. An electronic device comprising:
an artificial intelligence processor in which a learning model is stored; and
a controller configured to control an electric component provided on a human-powered vehicle, wherein
the artificial intelligence processor is configured to generate second information for controlling the electric component using the learning model to process first information related to at least one of a rider of the human-powered vehicle and an environment of the human-powered vehicle,
the artificial intelligence processor is configured to change a process for generating the second information in accordance with the first information and an operation of a first operation unit for operating the electric component by updating the learning model via a learning algorithm using a neural network,
the first operation unit communicates with the electronic device through a wireless connection, and
the controller controls the electric component via wireless communication.

19. The electronic device according to claim 18, wherein the electric component includes at least one of an electric transmission, a drive unit that applies propulsion force to the human-powered vehicle, an electric adjustable seatpost, and an electric suspension.

20. The electronic device according to claim 18, wherein the controller is configured to operate in:
a first control state for controlling the electric component in accordance with the second information, and
a second control state for controlling the electric component in accordance with the operation of the first operation unit.

* * * * *